United States Patent Office 3,083,207
Patented Mar. 26, 1963

3,083,207
NOVEL INDOLESULFONYLUREAS AND
INDOLINESULFONYLUREAS
Hans Hoehn and Hermann Breuer, Regensburg, Germany, assignors to Olin Mathieson Chemical Corporation, New York, N.Y., a corporation of Virginia
No Drawing. Filed June 21, 1961, Ser. No. 118,524
Claims priority, application Germany June 29, 1960
13 Claims. (Cl. 260—319)

This invention relates to indolesulfonylureas, indolinesulfonylureas and intermediates therefor.

The compounds of this invention may be represented by the following structural formula

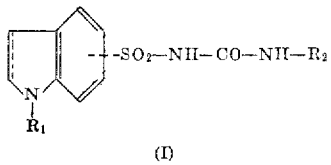

(I)

wherein $R_1$ represents hydrogen, alkyl, aryl, aralkyl or acyl and $R_2$ represents hydrogen, alkyl, alkenyl, aryl, aralkyl or cycloalkyl.

Metal salts such as alkali metal and alkaline earth metal salts of such compounds are also within the scope of this invention.

Illustrative of the substituents represented by the symbols $R_1$ and $R_2$ are straight and branched chain lower alkyl groups such as methyl, ethyl, propyl, isopropyl, butyl, tertiary butyl and the like; aryl groups, e.g. naphthyl, phenyl and monosubstituted phenyl groups such as halophenyl, for example p-chlorophenyl, p-bromophenyl, lower alkoxyphenyl, for example methoxyphenyl, lower alkylphenyl, for example tolyl and the like; aralkyl groups, especially phenyl-lower alkyl groups such as benzyl and substituted phenyl-lower alkyl wherein the aryl portion is the same as those enumerated above; lower alkenyl groups such as alkyl, butenyl and the like; cycloalkyl groups, especially those having 4 to 6 carbon atoms such as cyclobutyl, cyclopentyl and cyclohexyl; and the acyl radicals of lower fatty acids such as acetyl, propionyl, butyryl and the like. Representative salts include the sodium, potassium, calcium and barium salts.

The compounds of this invention are hypoglycemic agents with long duration of action which are effective in lowering blood sugar. The compounds of Formula I or pharmaceutically acceptable salts thereof may be administered orally in conventional dosage forms such as tablets, capsules and the like.

Preferred in the above described group of compounds are those having the following formulas

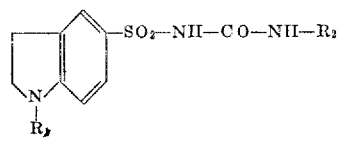

(II)

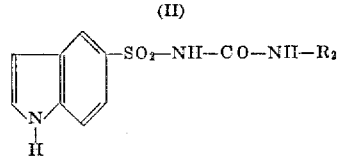

(III)

wherein $R_1$ and $R_2$ have the same meanings as described above and especially wherein $R_1$ represents acetyl.

The indolinesulfonylureas and indolesulfonylureas of this invention may be produced by converting a sulfonamide of the formula

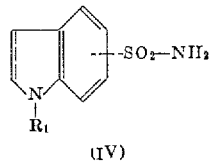

(IV)

wherein $R_1$ has the meaning already defined, into a salt, e.g., a sodium salt, and reacting the salt with a derivative of isocyanic acid, e.g., an isocyanic acid ester of the formula

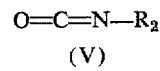

(V)

wherein $R_2$ has the meaning as defined above, or with a carbonic acid derivative, and if desired splitting off any protective group previously introduced into the heterocyclic portion of the molecule.

In using carbonic acid derivatives, the synthesis of the sulfonylureas of this invention may follow two alternate routes. The sulfonamide may be directly reacted with an N-substituted carbamic acid halide, preferably the chloride, or the corresponding urethane derivative. A sulfonylthiourea may be produced and then sulfur is removed or a sulfonyl cyanamide is reacted with a primary amine to form the corresponding quanidine, and this then is hydrolyzed. Then, upon splitting off ammonia and adding water, the urea derivative is obtained.

Still another alternative involves the conversion of isourea alkyl ethers with an indole.

In all cases the reaction conditions may be varied within broad limits. The conditions must also be adapted to the particular substituents being added to the indolinesulfonamide molecule.

The production of the starting sulfonamides of Formula IV also forms a facet of this invention. The introduction of a sulfonyl halide group into the aromatic ring of indoles is difficult to accomplish especially with satisfactory yield. The reactivity of the pyrrole ring in the indole system usually leads to the introduction of substituents in positions 1, 2 or 3 and the relative sensitivity of the heterocyclic system under strong reaction conditions in the presence of agents such as chlorosulfonic acid, concentrated sulfuric acid and the like, which are required to introduce the sulfonyl halide or sulfonamide groups. Even stepwise reactions do not produce practical yields.

It has now been found that a simple reaction scheme providing good yields of sulfonyl halides and sulfonamides of indoles having the formula

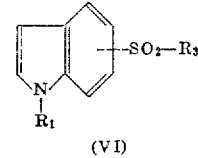

(VI)

wherein $R_1$ has the meaning already defined and $R_3$ represents halogen or $NH_2$ may be obtained when an indoline of the formula

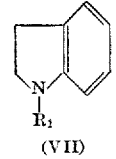

(VII)

is converted with a halosulfonic acid, preferably chlorosulfonic acid, to the corresponding sulfonyl halide of the formula

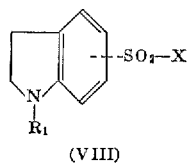

(VIII)

wherein X represents any of the halogens, converting the sulfonyl halide to the corresponding sulfonamide with ammonia and then dehydrogenating to obtain the indole derivative.

Preferably the production of the sulfonyl halide from the indoline is effected by using an N-acetylated-indoline or N-alkylated-indoline, i.e., a compound of, Formula VII, wherein $R_1$ represents an acyl group such as acetyl, or a straight chain alkyl group such as ethyl, which is treated with an excess of halonsulfonic acid, preferably chlorosulfonic acid, at about 40 to 80° C., preferably 60°, and, after hydrolyzing with water, isolating the indolinesulfonyl halide. The crude sulfonyl halide may then be converted into the indoline-sulfonamide, without purification if desired, e.g. by reaction with ammonia.

The indolinesulfonic acid derivative may be converted to the corresponding indole compound by dehydrogenation, e.g. by means of tetrachloro-p-quinone (chloranil) or other quinones, or through the action of oxidation agents such as mercuric oxides, hydrogen peroxide or other inorganic or organic peroxides or by means of a dehydrogenating catalyst such as Raney nickel or palladium, according to the method of Kornfield and Woodward.

A method for producing the starting material 6-indolesulfonamide comprises acylating 6-nitro-indole-3-carboxylic acid, e.g., with acetic anhydride to obtain, for example, 1-acetyl-6-nitro-indole-3-carboxylic acid, catalytically reducing the latter, e.g., with palladium, to produce the corresponding 6-amino indoline derivative, diazotizing, for example, with nitrous acid in dilute hydrochloric acid at about 0° C. and reacting the diazonium compound formed with sulfur dioxide, to obtain 6-chlorosulfonyl-1-acetyl-indoline-3-carboxylic acid which is treated with ammonia to form the corresponding 6-amidosulfonyl derivative. This is decarboxylated at elevated temperature to the 1-acetyl-6-indoline-sulfonamide and then dehydrogenated with chloranil to obtain the 1-acetyl-6-indolesulfonamide. Treatment with a base such as sodium hydroxide effects the removal of the acetyl group, if desired.

The following examples are illustrative of the invention. All temperatures are expressed in degrees centigrade.

Example 1

(a) 16.1 g. of N-acetylindoline are introduced with stirring into 58.5 g. of chlorosulfonic acid. The mixture is stirred for two hours at 60°, and after cooling, it is poured onto ice. The precipitated sulfonylchloride is filtered with suction and the product washed with water. 22.6 g. of product are obtained which is recrystallized from benzene, M.P. 172–173°.

(b) 16.1 g. of the 1-acetyl-5-indolinesulfonyl chloride are introduced into 900 ml. of approximately 15% ammonia water and stirred for three hours at room temperature. At the end of the reaction, the product is filtered with suction, dissolved in dilute sodium hydroxide solution, the solution is treated with activated charcoal, filtered and the filtrate acidified with dilute acetic acid. 18.4 g. of 1-acetyl-5-indolinesulfonamide are obtained which is recrystallized from 80% alcohol, M.P. 228–229°.

(c) The 1-acetyl-5-indolinesulfonamide obtained above is hydrolyzed with sodium hydroxide solution to obtain the free 5-indolinesulfonamide (M.P. 163–165°). 2 g. of 5-indolinesulfonamide are boiled under reflux with 2.5 g. of chloranil in 30 ml. of ethylene glycol dimethyl ether for 30 minutes. The solvent is distilled off under vacuum and the residue is triturated with water and filtered. The product is dried and extracted with ether to obtain 1.8 g. of 5-indolesulfonamide, which is recrystallized from acetone, M.P. 208°.

Example 2

31.2 g. of ethyl(1-acetyl-5-indolinesulfonyl) carbamate are treated with 10 g. of cyclohexylamine and thoroughly mixed. The mixture is heated for 30 minutes at 130° in an oil bath whereupon a syrupy mass is formed. After cooling, this is comminuted and treated with dilute sodium hydroxide solution whereupon most of the material goes into solution. The solution is diluted to approximately 800 ml. and adjusted to pH 7.5 with dilute acetic acid. The precipitated by-products are filtered off and the filtrate is acidified with dilute acetic acid until complete precipitation is effected. The 1-cyclohexyl-3-(1-acetyl-5-indolinesulfonyl)urea is obtained in a yield of 20 g. and after recrystallization from aqueous acetone melts at about 199–200°.

Example 3

48 g. of 1-acetyl-5-indolinesulfonamide are dissolved in 100 ml. of 2 N sodium hydroxide solution and 60 ml. of acetone. 31.4 g. of benzyl isocyanate are added to the solution dropwise with stirring at 10–15°. After stirring for two hours at room temperature, the solution is diluted with one liter of water and filtered. The filtrate is acidified with dilute acetic acid and the precipitate is filtered under suction. The damp, crude product is recrystallized from 70% acetone. 52.5 g. of 1-benzyl-3-(1-acetyl-5-indolinesulfonyl)urea are obtained, M.P. 199–200°.

Example 4

36 g. of 1-acetyl-5-indolinesulfonamide are dissolved in 75 ml. of 2 N sodium hydroxide solution and 100 ml. of acetone. 18 g. of n-butyl isocyanate are added to the solution dropwise with stirring at 10° and the mixture is then stirred at room temperature for two hours. The mixture is then diluted with five volumes of water, filtered and acidified with dilute acetic acid. The precipitate is filtered under suction, washed with water, dried and recrystallized from 80% alcohol. 37.2 g. of 1-butyl-3-(1-acetyl-5-indolinesulfonyl)urea are obtained, M.P. 185–187°.

Example 5

31.5 g. of 1-butyl-3-(1-acetyl-5-indolinesulfonyl)urea are dissolved in 185 ml. of 2 N sodium hydroxide solution and heated for two hours in boiling water. The solution is then diluted with five volumes of water and acidified with dilute acetic acid. After filtering under suction and drying, 26.6 g. of 1-butyl-3-(5-indolinesulfonyl)urea are obtained, which are recrystallized from acetone water, M.P. 121–123°.

Example 6

15.8 g. of 5-indolesulfonamide are dissolved in 40.5 ml. of 2 N sodium hydroxide solution and 40 ml. of acetone. 10.5 g. of butyl isocyanate are added to the solution dropwise with stirring at 10–15°. The mixture is stirred for an additional two hours then diluted with water to a volume of 500 ml. of water, treated with activated charcoal and filtered. The filtrate is acidified with dilute acetic acid. The precipitate is filtered off, dissolved in dilute ammonia and again precipitated by acidifying with dilute acetic acid. 15.6 g. of 1-butyl-3-(indolesulfonyl)urea are obtained and are recrystallized from isopropanol, M.P. 137–138°.

Example 7

By substituting cyclohexyl isocyanate in the procedure of Example 6, 1-cyclohexyl-3-(5-indolesulfonyl)urea is obtained, M.P. 177–178°.

Example 10

By substituting ethyl (1-acetyl-6-indolinesulfonyl)- carbamate in Example 2, there is obtained 1-cyclohexyl-3-(1-acetyl-6-indolinesulfonyl)urea.

Example 11

By substituting 1-cyclohexyl-3-(1-acetyl-6-indolinesulfonyl)urea in Example 5, there is obtained 1-cyclohexyl-3-(6-indolinesulfonyl)urea.

Example 12

To 24.0 g. 1-acetyl-5-indolinesulfonamide, 200 ml. of acetone, 11.8 g. of anhydrous potassium carbonate is added 12 g. of ethyl chlorocarbonate, dropwise and the mixture is stirred and refluxed overnight. The solid is filtered, dissolved in water and the solution acidified to give ethyl (1-acetyl-5-indolinesulfonyl)carbamate.

Example 13

By reacting 1-acetyl-6-indolinesulfonamide, M.P. 225–226°, with n-butyl isocyanate according to the procedure of Example 4, 1-butyl-3-(1-acetyl-6-indolinesulfonyl)urea is obtained, M.P. 186–187°.

Example 14

By reacting 1-acetyl-6-indolinesulfonamide with cyclohexyl isocyanate according to the procedure of Example 4, 1-cyclohexyl-3-(1-acetyl-6-indolinesulfonyl)urea is obtained, M.P. 190–191°.

Example 15

By following the procedure of Example 5, the product of Example 13 is converted to 1-butyl-3-(6-indolinesulfonyl)urea, M.P. 129–130°.

Example 16

By following the procedure of Example 5, the product of Example 14 is converted to 1-cyclohexyl-3-indolinesulfonyl)urea, M.P. 170–175°.

What is claimed is:
1. A compound selected from the group consisting of sulfonylureas of the formula

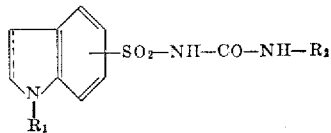

wherein $R_1$ is a member of the group consisting of hydrogen, lower alkyl, lower alkanoyl, phenyl, substituted phenyl, phenyl-lower alkyl and substituted phenyl-lower alkyl; and $R_2$ is a member of the group consisting of hydrogen, lower alkyl, lower alkenyl, cycloalkyl of 4 to 6 carbon atoms, phenyl, substituted phenyl, phenyl-lower alkyl and substituted phenyl-lower alkyl wherein the phenyl substituent in each instance is a member of the group consisting of halo, lower alkoxy and lower alkyl, and alkali metal and alkaline earth metal salts thereof.

2. A compound of the formula

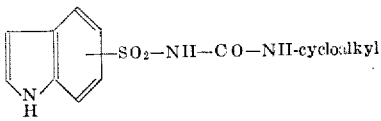

wherein the cycloalkyl group has 4 to 6 carbon atoms.

3. A compound of the formula

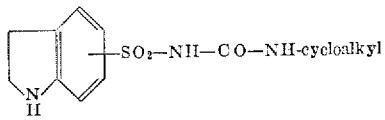

wherein the cycloalkyl group has 4 to 6 carbon atoms.

4. A compound of the formula

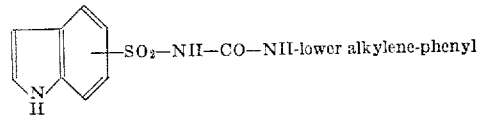

5. A compound of the formula

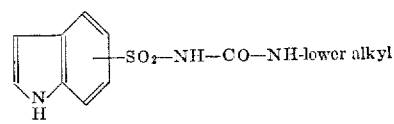

6. A compound of the formula

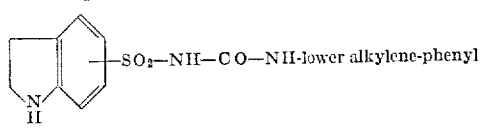

7. A compound of the formula

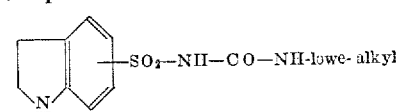

8. 1-butyl-3-(5-indolylsulfonyl)urea.
9. 1-cyclohexyl-3-(5-indolylsulfonyl)urea.
10. 1-butyl-3-(5-indolinylsulfonyl)urea
11. 1-cyclohexyl-3-(5-indolinylsulfonyl)urea.
12. 1-benzyl-3-(5-indolinylsulfonyl)urea.
13. 1-(1-acetyl-5-indolinylsulfonyl)-3-cyclohexylurea

References Cited in the file of this patent

Tepehmbee: Zhurnal Obshchei Khimii, volume 30, No. 4, pages 1218–1222 (May 31, 1960).

UNITED STATES PATENT OFFICE
CERTIFICATE OF CORRECTION

Patent No. 3,083,207            March 26, 1963

Hans Hoehn et al.

It is hereby certified that error appears in the above numbered patent requiring correction and that the said Letters Patent should read as corrected below.

Column 3, line 18, for "halonsulfonic" read -- halosulfonic --; column 4, line 72, after "177-178°." insert the following:

Example 8

By substituting 1-acetyl-6-indolinesulfonamide in Example 4, there is obtained 1-butyl-3-(1-acetyl-6-indolinesulfonyl)urea.

Example 9

By substituting 1-butyl-3-(1-acetyl-6-indolinesulfonyl)urea in Example 5, there is obtained 1-butyl-3-(6-indolinesulfonyl)urea.

Signed and sealed this 12th day of November 1963.

(SEAL)
Attest:
ERNEST W. SWIDER
Attesting Officer

EDWIN L. REYNOLDS
Acting Commissioner of Patents